Dec. 21, 1926.
W. F. KELLER
1,611,457
VALVE MECHANISM
Filed Nov. 28, 1923
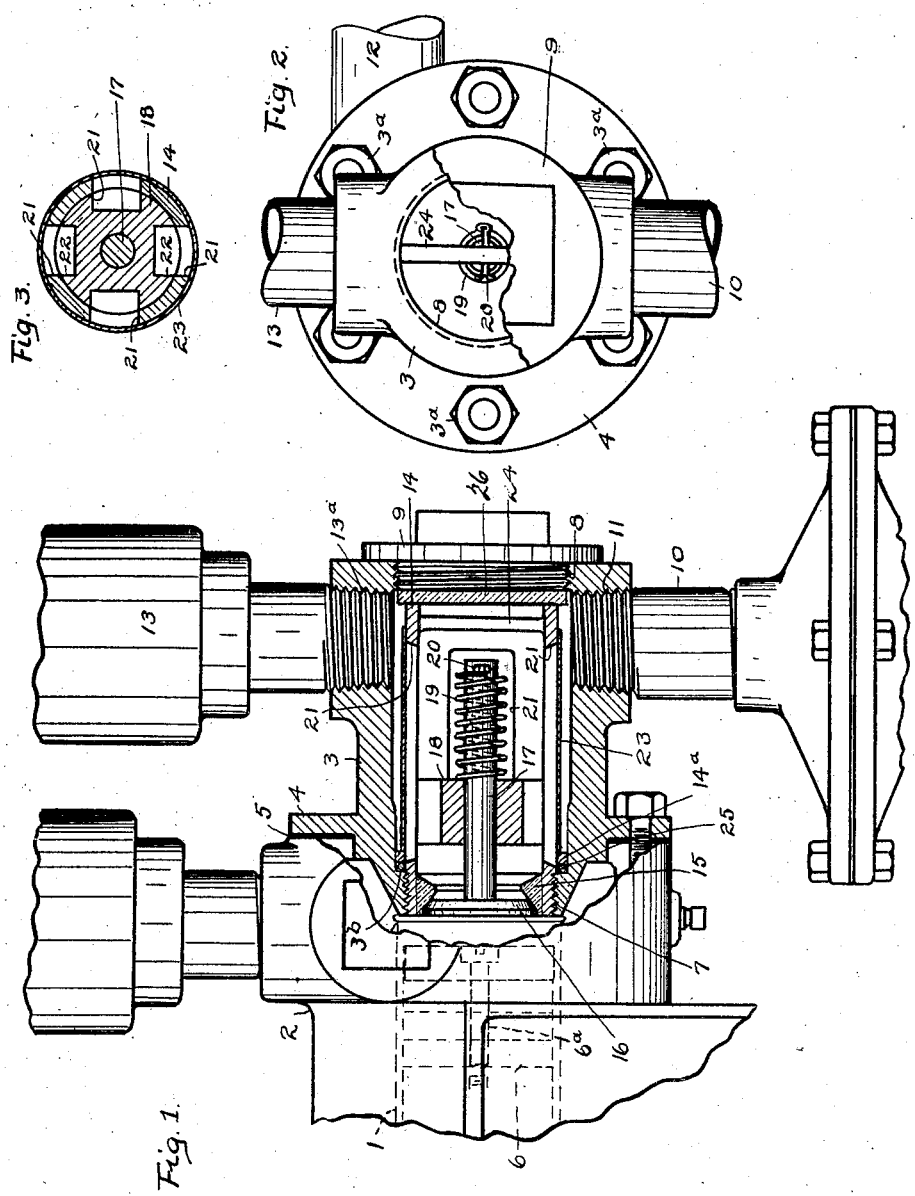
William F. Keller
INVENTOR
BY [signature]
ATTORNEY Patented Dec. 21, 1926.

1,611,457

UNITED STATES PATENT OFFICE.

WILLIAM F. KELLER, OF FORT WAYNE, INDIANA.

VALVE MECHANISM.

Application filed November 28, 1923. Serial No. 677,376.

The invention relates to valve mechanisms, and is particularly directed to the mounting of valves in fluid pumps.

In many pump mechanisms where the controlling valve in the fluid line is located at the end of the pump cylinder it is a laborious matter to gain access to the plunger for the renewal of the packing glands, since the entire valve mounting including its casing or cylinder head must be removed from the fluid line and disconnected from the cylinder in order to expose the end of the cylinder and the plunger. The valve itself needs attention at intervals and ready access to it is most desirable.

The object of my invention is to provide a novel and simple valve mounting removably supported in a casing to which the fluid line and the pump cylinder are connected so that when it is removed from the casing access to the cylinder is gained through the casing. Other objects will appear hereinafter.

An embodiment of the invention is illustrated in the accompanying drawings in which—

Figure 1 is a side view, partly in section, of a mechanism embodying the invention; Fig. 2 a front elevational view of the same, partly broken away, and Fig. 3 a vertical cross section of the valve supporting member.

In the drawings I have illustrated the invention as applied to a horizontal type of pump cylinder, but it will be understood that I do not thereby limit the same to such application.

Referring to the drawings, 1 represents a portion of the cylinder structure to the head 2 of which the valve casing 3 is secured by the bolts 3ª that are projected through a flange 4 on the casing. The inner end of the casing is projected into the head 2, suitable packing 5 between the flange 4 and the opposed face of the head causing a fluid tight joint to be made between them. 6 represents the plunger. An opening 7 in the inner end of the casing is larger than the plunger so that access to the screw 6ª of the plunger may be had through said opening for removing the packing glands of the plunger. A relatively large opening 8 is formed in the outer end of the casing that is normally closed by a threaded cap or plug 9.

The intake pipe 10 is threaded into a port 11 formed in the wall of the casing 3, and the discharge pipe 12 is connected to the cylinder head 2. An expansion chamber 13 is connected at port 13ª formed in the casing 3.

The wall of the opening 7 is threaded to receive the threaded end of a sleeve 14, having a seat 15 preferably of hard rubber at said end for the valve 16. The stem 17 of the valve is reciprocably supported in a suitable guide, such as the spider 18, that is secured to or is integral with the wall of the sleeve. A spring 19 is coiled about the stem and at one end abuts the spider, and its opposite end abuts a pin 20 carried by the stem. The spring opposes all inward or unseating movement of the valve occasioned by the reciprocation of the plunger toward the left (Fig. 1), and hence tends to hold the valve on its seat.

Longitudinal slots 21 are formed in the wall of the sleeve 14 and the openings 22 in the spider between its arms form communications between opposite sides of the spider, and preferably register with the longitudinal slots 21.

A screen 23 of suitable mesh surrounds the exterior face of the sleeve. The inner end of the screen abuts a collar 14ª formed on the sleeve, between which collar and the end wall 3ᵇ of the casing is a gasket 25 to cause the connection between the sleeve and the casing to be fluid tight.

A pin 24 carried by the sleeve affords an easy means by which the sleeve may be rotated to install it in or remove it from the casing.

A rubber gasket 26 is inserted between the outer end of the sleeve 14 and the cap or plug 9, which not only aids in sealing the cap, but also serves as a cushion for the sleeve and absorbs the shock occasioned by the seating of the valve and it thereby removes the noise produced by the valve.

When the plunger is reciprocated the fluid is drawn into the casing through the pipe 10 filling the casing and the valve sleeve and flowing into the cylinder. The return stroke of the plunger forces the fluid out through the discharge pipe, the valve being then closed.

By removing the plug 9, the valve sleeve is easily grasped by a wrench or pliers and rotated in proper direction. When the threads are free the sleeve with the valve therein is then withdrawn through the opening 8, and affords access through the valve casing to the plunger. The valve or its seat or the screen may also be cleaned or repaired when removed from the casing.

It is unnecessary to remove the casing or cylinder head to accomplish all said repairs and hence a large amount of labor and time is saved in making such repairs.

What I claim is:

A casing adapted to be secured to a pump cylinder and having its opposite ends open, the outer end being adapted to open to atmosphere, removable means normally closing the latter end, a longitudinally slotted sleeve removably supported in the inner open end of the casing and extending toward said outer end, an elastic member between the sleeve and the removable means, a hard rubber seat at one end of the sleeve, a screen surrounding the sleeve, a valve mounted in the sleeve and adapted to engage the seat, a fluid intake pipe connected to the casing, the sleeve, valve and screen being removable as a unit from the casing through the outer end thereof for exposing the interior of the cylinder to the casing.

In witness whereof I have hereunto subscribed my hand this 17th day of November, 1923.

WILLIAM F. KELLER.